United States Patent [19]
Minkiewicz

[11] 3,904,845
[45] Sept. 9, 1975

[54] METHOD AND DEVICE FOR SIMULATING WELDING OPERATIONS

[75] Inventor: Edmond André Minkiewicz, Paris, France

[73] Assignee: Societe Entrepose G.T.M. pour les Travaux Petroliers Maritimes, E.T.P.M., Paris, France

[22] Filed: Mar. 28, 1974

[21] Appl. No.: 455,864

[30] Foreign Application Priority Data
Aug. 22, 1973 France .......................... 73.30438

[52] U.S. Cl. .................. 219/124; 29/493; 219/61; 219/158; 219/159; 219/161; 228/49
[51] Int. Cl.² .......................................... B23K 9/00
[58] Field of Search ........ 29/493; 219/61, 124, 158, 219/159, 161; 228/49

[56] References Cited
UNITED STATES PATENTS
| | | | |
|---|---|---|---|
| 1,986,740 | 1/1935 | Moreira | 219/161 |
| 2,303,720 | 12/1942 | Berkeley | 219/124 |
| 3,275,794 | 9/1966 | Dubusker et al. | 219/161 X |
| 3,658,286 | 4/1972 | Terai et al. | 219/158 X |
| 3,718,797 | 2/1973 | Pfender | 228/49 X |

Primary Examiner—J. V. Truhe
Assistant Examiner—N. D. Herkamp

[57] ABSTRACT

This invention relates to a method and to devices for simulating the position welding of fixed metal members, specially of tubular members. To simulate the orbital welding of two fixed tubular members, two flat pieces of metal are disposed on a table supported by a rotary frame. This frame also supports a slideway, along which a carriage carrying one of several different welding heads is moved so that the torches of said welding heads be caused to travel along the close-spaced facing edges of the two flat pieces of metal. The carriage is moved in synchronism with the rotation of the rotary frame. This invention is applicable to the evaluation of automatic welding procedures for the construction of pipe lines for oil and miscellaneous fluids, such as gases and the like, as well as for the construction of other tubular metal structures.

3 Claims, 16 Drawing Figures

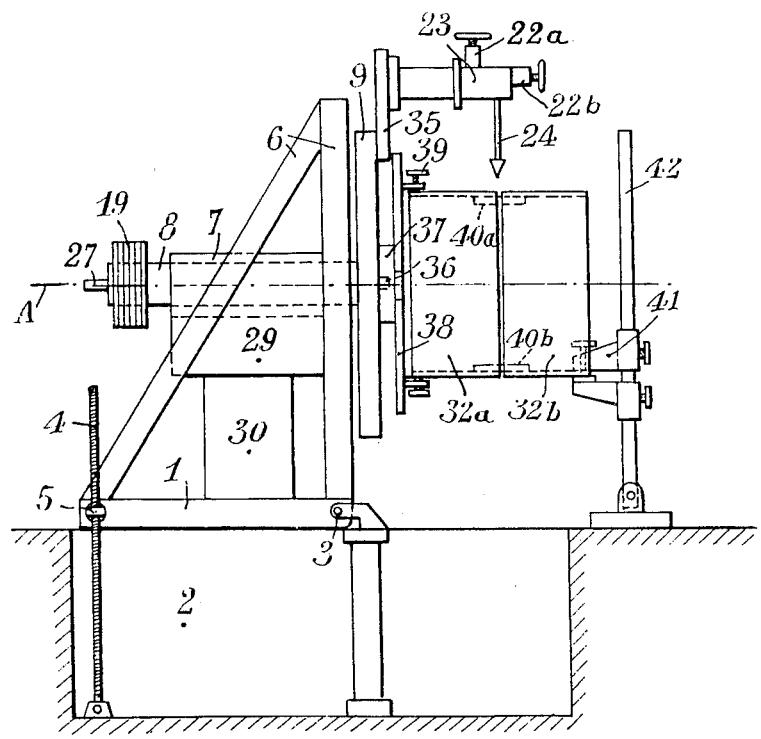

METHOD AND DEVICE FOR SIMULATING WELDING OPERATIONS

FIELD OF THE INVENTION

The present invention relates to a method of and to devices for simulating the welding, more particularly but not exclusively the orbital welding, of fixed metal members specially of tubular members.

In the construction of a wide range of metal structures such as frameworks, tanks, pipe lines, pipings and the like, it is frequently necessary to assemble fixed metal members, especially tubular members, by means of circumferential welded joints or seams that can be performed only by moving the welding head along a generally looped or closed path about the joint of the fixed members to be assembled; to accomplish such so-called "orbital" welding operations, various mechanisms have been developed for automatically moving the welding head about the fixed members to be welded.

The development of these automatic orbital welding procedures involves a great number of preliminary tests concerning notably the welding head or heads to be used according to the particular nature of the work to be performed, the filler wire and the various fluids to be supplied to the welding heads, etc.. Such preliminary tests could possibly be performed under full-scale conditions by using a complete machine, including the mechanism for moving the welding head along a closed-loop path, but this direct method is often impracticable, and always difficult to be carried out; in fact, the aforesaid mechanism, which is frequently manufactured by a maker other than the one delivering the welding heads, is not always available for performing the tests contemplated with the heads; on the other hand, when the welding operations are to be carried out on tubular members having a diameter of one or several meters, full-scale tests obviously require extremely cumbersome and expensive equipments.

For all the reasons set forth hereinabove, there has been a wide demand, during the last decade, among those dealing with orbital welding methods, for convenient means enabling welders to avoid full-scale tests and substituting welding simulation tests therefor, these means being more economical, easier to be used and requiring relatively less cumbersome and less expensive devices.

SUMMARY OF THE INVENTION

A first object of this invention is to provide a method of simulating the orbital welding of fixed metal members, especially tubular members, this method consisting in bringing close to each other the edges of a pair of flat pieces of metal, and welding these edges together while pivoting said elements about a fixed axis as the welding seam progresses, so that the mass of molten metal will pass in succession through all the positions likely to be occupied thereby during an actual orbital welding.

Since the specific features of orbital welding result essentially from the mass of molten metal occupying in succession different positions in relation to the direction of gravity, which exerts an obvious influence on said mass of molten metal, a second object of this invention is to provide a method permitting of testing one or a plurality of welding heads by operating them on flat pieces of metal which are considerably simpler and easier to be handled than the tubular members to be assembled, while obtaining nevertheless welding conditions corresponding substantially to those actually encountered in full-scale orbital welding.

Another object of this invention is to provide a device for simulating the welding, more particularly but not exclusively the orbital welding, of fixed metal members, especially tubular members, this device comprising a frame rotatably mounted on a horizontal axle or on a controllably tiltable axle, and means for detachably mounting at least one welding head to said frame.

A further object of this invention is to provide a device intended more particularly for simulating the orbital welding of members through the above-disclosed method, and wherein the rotary frame supports a table substantially parallel to its axle, a welding-head driving carriage guided parallel to said table, and means for securing a pair of flat pieces of metal to said table with their facing rectilinear edges being disposed in an closed relationship in the rectilinear path of the welding torch.

A still further object of this invention is to provide a first embodiment of the device set forth hereinabove, wherein one edge of the table is mounted to the rotary frame so as to rotate about an axis perpendicular to the axis of rotation of said frame, said table edge being rigid with a tray perpendicular to said table and supporting the welding-head driving carriage, and means are further provided for holding the table and tray assembly in a predetermined adjustably inclined position in relation to said rotary plate.

The device according to this invention is further advantageous in that, in addition to orbital welding tests, it is suitable for making welding tests with a fixed welding head, that is, for a predetermined and fixed inclination of the welding torch to the vertical. These last tests are made possible by locking the rotary plate in the proper angular position about its axle.

Still another object of this invention is to provide a second embodiment of the device set forth hereinabove, wherein the welding head is secured by means of a radial arm to the rotary frame, other means being provided for supporting two tubular metal members in a fixed position in front of the rotary frame, with the facing circular edges of said tubular members being disposed close to each other in the circular path of the welding torch.

This second embodiment of the device according to this invention permits of simulating a full-scale test of orbital welding in case the mechanism to be subsequently used on the construction site for imparting the orbital movement to the welding head were not available for such tests.

A last object of this invention is to provide a device comprising a frame rotatably mounted on a horizontal axle or on a controllably tiltable axle, a fixed support, specially having the shape of an annular segment, disposed concentrically to said rotary plate, means for securing a welding head to said fixed support in a predetermined, adjustable angular position about the axle of said rotary plate, and other means for securing to said rotary plate a pair of tubular metal members with their facing circular edges being disposed close to each other in a same plane as said welding torch.

This last-mentioned device is particularly suitable for studying anyone of the successive steps of an orbital welding operation, said step being extended to a complete circular seam.

BRIEF DESCRIPTION OF THE DRAWINGS:

FIG. 13 is a side elevational view of a typical embodiment of the device according to this invention for performing the orbital welding of two tubular metal members held in a fixed position;

FIG. 14 illustrates the use of the device of FIG. 13 for simulating an oblique orbital welding.

DESCRIPTION OF THE PREFERRED EMBODIMENTS

Figure 1:
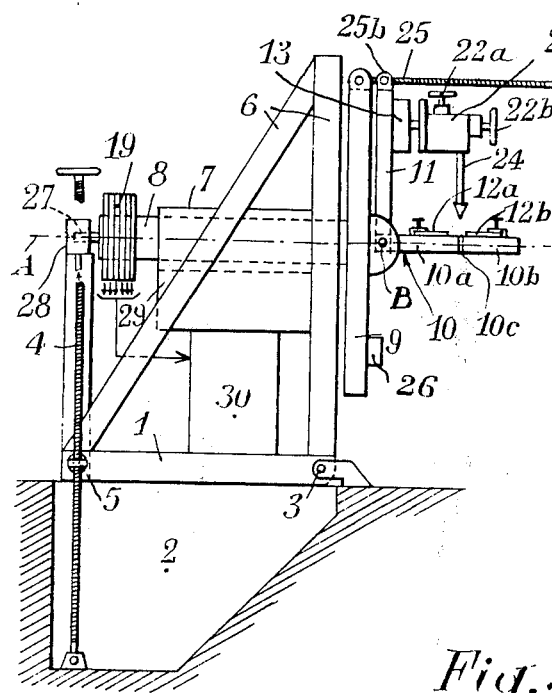
FIGS. 1 and 2 are a side-elevational view and a front view, respectively, of a typical embodiment of the device according to this invention for simulating a welding operation, specially but not exclusively an orbital welding operation, on two flat pieces of metal.

The embodiment of the simulator according to this invention, as illustrated diagrammatically in FIGS. 1 and 2 of the drawings, comprises firstly a base plate 1 for example of rectangular configuration, supported in a manner permitting its setting with an adjustable inclination in relation to the horizontal plane, as follows: bracket means are anchored or sealed in the floor or ground surface, and comprise pivot pins 3 engaging one side of said rectangular base plate 1; besides, a vertical screw rod 4 having its lower end adapted to bear against the bottom of a pit 2 engages a nut 5 rigid with the side of base plate 1 opposite said pins 3; it is clear that, with this arrangement, when the screw rod 4 is rotated in one or the other direction the base plate 1 is rotated about the pivot pins 3 in order to set this plate 1 in the desired inclined position above or below the horizontal plane corresponding to the floor or ground surface.

Mounted to the top surface of base plate 1 is a sturdy frame structure 6 consisting preferably of metal sections and adapted to support a bearing 7 for a shaft 8 parallel to said base plate 1; secured to the right-hand of this shaft 8 (as seen in FIG. 1) and perpendicularly thereto is a rotary frame 9 supporting in turn a table 10 disposed substantially parallel to the shaft 8 (as shown by the axis A in FIG. 1); in the embodiment illustrated, this table 10 has one edge mounted to the rotary frame 9 for pivotal movement about an axis B perpendicular to the axis of rotation A of said frame 9; on the other hand, the same edge of table 10 is rigid with a tray 11 perpendicular to the table 10 and to said axis A, as shown in FIG. 1. The table 10 is divided into two sections 10a and 10b adapted to slide in relation to each other so as to provide therebetween a slot 10c of adjustable width, which extends in a plane perpendicular to the axis A of shaft 8. The top surface (in FIG. 1) of table 10 has formed therein grooves and holes in a manner known per se, permiting the convenient mounting or fastening, means of well-known clamping means, of a pair of coplanar flat pieces of metal 12a and 12b, of which the facing rectilinear edges are brought substantially together in the vertical plane (as seen in FIG. 2) of said slit 10c of table 10.

Figure 3:
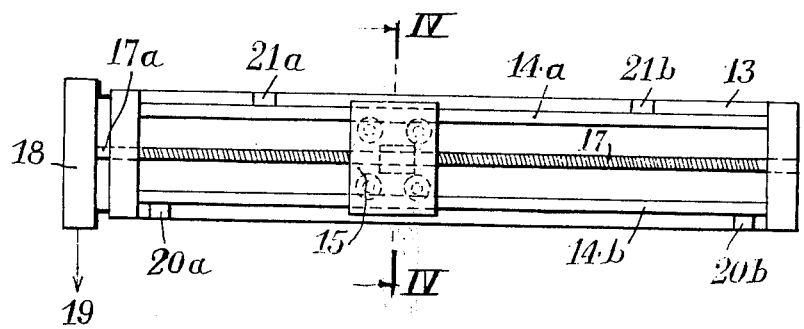
FIGS. 3 and 4 are detail views of specific embodiments of parts of the device shown in FIGS. 1 and 2.
Figure 4:
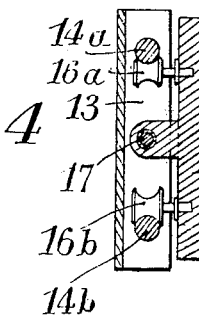

A flat slideway 13 (see also FIGS. 3 and 4) is secured to the face of tray 11 which is opposite the rotary frame 9, and parallel to the axis B of table 10. In the embodiment contemplated herein and illustrated notably in FIGS. 3 and 4, this slideway 13 comprises a pair of circular-sectioned rails 14a, 14b on which a carriage 15 is adapted to run freely; this carriage comprises essentially a thick plate supported and guided along the rails 14a, 14b by means of grooved rollers such as 16a and 16b; the movement of carriage 15 along the slideway 13 is controlled by means of a worm 17 engaging a correspondingly internally-threaded boss of said carriage 15, the ends of this worm being trunnioned in suitable bearings at the ends of slideway 13; the end 17a of worm 17 is on the other hand rotatably driven from a motor and reducing-gear assembly 18 supplied with energizing current through one ring of a slipring commutator or assembly 19 (FIG. 1) mounted at one end of shaft 8, opposite to rotary plate 9; limit switches 20a and 20b, inserted in the electric supply circuit of said motor and reduction-gear assembly 18, are so arranged that they are actuated by the carriage 15 when the latter approaches the corresponding ends of slideway 13; between these end limits, the permissible stroke of carriage 18 may be adjusted in a manner known per se, for instance by means of electric limit switches 21a and 21b, also inserted in the energizing circuit of the motor and reduction assembly 18 and adapted to be actuated by the carriage 15, said limit switches 21a, 21b being movable along slideway 13.

The front face of carriage 15 is provided with mutually perpendicular slideways associated with adjustable clamping devices 22a and 22b (FIG. 1) for fastening any suitable and known type of welding head 23; the assembly is so constructed that the torch 24 of the welding head 23 can be set in the vertical plane (FIG. 1) containing the slot 10c of table 10, the registering rectilinear edges of said sheet-metal plates 12a and 12b being brought together on either side of this vertical plane so that the welding torch 24 travel in this plane when the carriage itself is moved along the slideway 13.

A control system comprising a screw rod 25 having one end mounted by means of twin pivots to the plate 9 and its opposite end provided with a handwheel 25a, is engaged by a nut 25b pivoted to the tray 11, whereby this tray 11 can be inclined together with the table 10 rigid therewith in relation to the rotary plate 9 through an angle ranging from 0° to 90°. A counterweight 26 (FIG. 2) is secured to the rotary frame 9 for balancing same about the axis A of shaft 8. The above-mentioned commutator 19 comprises other slip-rings adapted, together with insulated conductors disposed in a longitudinal passage formed in shaft 8, to deliver to the welding head the various electric currents and voltages necessary for energizing and regulating same; said welding head 23 may also be supplied through a conduit 27 with any gas that may be required for operating the torch 24, said conduit 27 being disposed coaxially to the shaft 8 and co-acting, at the free end of shaft 8, with a fixed distributor 28.

Also mounted on said frame 6 beneath the bearing 7 is a motor and reduction gear unit 19 for rotatably driving the shaft 8 and the rotary frame 9 rigid therewith, for example by means of intermediate coupling gears (not shown) co-acting through an aperture or slot of said bearing 7. This unit 29, like the other motor and reduction gearing 18, are controlled from a control cabinet 30 which, in the embodiment contemplated herein, is disposed on the base plate 1 beneath the unit 29. This control cabinet 30 is so designed that predetermined movements of rotation can be transmitted to shaft 8 and rotary frame 9, while imparting to the driving carriage 15 and to the welding head 23 secured thereto a movement of translation along the slideway 13, which is also predetermined and may be synchronized, if necessary, with the said rotation of frame 9; in other words, in addition to the possibility of synchronizing the speed of rotation of plate 9 and the speed of translation of carriage 15, each speed being variable and adjustable with precision, the beginning and the end of these movements of rotation and translation of frame 9 and carriage 15, respectively, may be programmed in various manners for carrying out test welding operations as will be described presently. This control cabinet 30 is also adapted to control automatically the ON and OFF positions of welding head 23 according to preset programs; thus, one program may be adapted to start the heating of the sheet-metal plate elements 12a, 12b by means of the welding torch 24 before starting the rotation of rotary frame 9. Furthermore, this control cabinet 30 may comprise various types of control means, notably electromechanical and/or electronic control means, or possibly hydraulic or pneumatic control means; this invention should not be construed as being particularly limited to a specific embodiment of this control unit 30, since the latter is not an essential element of the invention.

The complexity of the welding operations to be performed in modern works for example of the type broadly mentioned in the foregoing and the wide range of welding methods and equipments required for accomplishing these welding works are such that the use of preliminary tests, whether in a laboratory or in a workshop, have become a must from the dual point of view of the welding methods themselves and of the equipment to be used therefor (the term "equipment" covering not only the welding heads and their welding torches, but also all their accessories, notably those for supplying electric current, various gaseous fluids and, of course, the welding metal, notably in the form of fusible wires or electrodes). Although for obvious reasons a complete list of the numerous welding methods and equipments adapted to be tested by means of the device illustrated in FIGS. 1 and 2 cannot be given, a few possible test procedures (of which at least some are quite new and within the scope of this invention) will now be described by way of examples.

Figure 7:
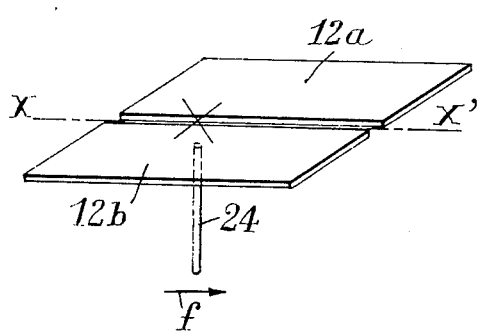
Figure 8:
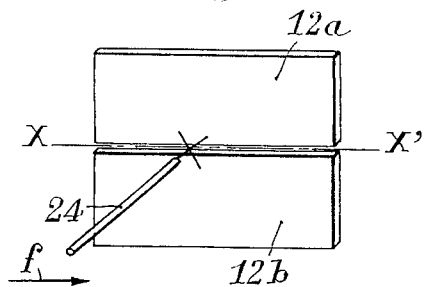

I - Simulating the welding of joints forming a constant angle throughout their length with the vertical This condition is observed notably in the horizontal and vertical welding seams of certain metal structures such as cylindrical tanks, hulls of ships, etc.. According to the angle formed between the weld seam and the vertical, four main welding positions are observed, as illustrated in FIGS. 5 to 8 of the drawings; all these positions may be simulated by setting the base plate 1 of the device shown in FIGS. 1 and 2 in the horizontal position (FIG. 1); in all these FIGS., 12a and 12b designate the two pieces of metal secured to the table 10 with their rectilinear edges brought together along the direction of the seam shown by the line X X'; the reference numeral 24 designating the welding torch of welding head 23, the movement of carriage 15 along the slideway 13 permits of obtaining a movement of said torch parallel to said seam direction XX', as shown by the arrow $f$. The flat welding shown diagrammatically in FIG. 5 may be simulated when the axis B of table 10 (FIG. 1) carried by rotary plate 9 is in its horizontal position as shown diagrammatically in FIG. 1. The so-called vertical welding illustrated diagrammatically in FIG. 6 may be simulated by maintaining the table 10 in the position (in relation to rotary frame 9) shown in FIG. 1, wherein the angle between the tray 11 and said plate 9 is substantially zero, and causing this frame 9 to pivot bodily with its shaft 8 through 90° in one or the other direction, so as to bring the table 10 and consequently the seam direction X X' to a vertical position according to the direction of the movement then imparted to the torch 24, as shown by one or the other of the two arrows $f_1$, $f_2$, it is possible to simulate the upward or downward welding operation. If, instead of pivoting the rotary frame 9 about its shaft 8 as in the preceding procedure this frame 9 is pivoted through 180°, a so-called "overhead" welding operation may be simulated, as illustrated in FIG. 7. Finally if the rotary frame 9 is set in the angular position as shown in FIG. 1, in which the axis B of table 10 is horizontal, and if this table 10 is pivoted downwards about its axis B through 90°, so as to position this table 10 vertically, the tray 11 associated therewith becoming horizontal, notably by actuating the screw rod 25, a so-called "horizontal" welding operation can be simulated, as illustrated diagrammatically in FIG. 8. Of course, during these various simulations, the rotary frame 9 and its shaft 8 are locked against rotation in the desired and suitable angular position as shown, and the control unit 30 controls only the movement of carriage 15 on slideway 13, and also the programmed actuation of the welding head 23. Similar tests may also be carried out with the table 10 in the position shown in FIG. 1, the frame 9 itself being locked in any suitable angular position intermediate between those occupied by this plate for the simulations illustrated in FIGS. 5 to 7 and described hereinabove.

II - Simulating of the welding of seams forming a variable angle to the vertical Assuming that the welding of circular joints or seams between tubular sections of same diameter, having their aligned axes disposed horizontally or, possibly, obliquely, are contemplated; such welding operations performed on fixed tubular sections or pipes are required in many installations and constructions, notably in the case of piping systems for conveying miscellaneous fluids, such as oil pipe lines; modern automatic machines comprising at least one welding head and means for moving these heads at a suitable speed about the seam to be welded are well known in the art; this operation is usually referred to as the "orbital" welding procedure. This orbital welding procedure is also used, for example, in the welding of the meridian joints of spherical tanks.

Figure 5:
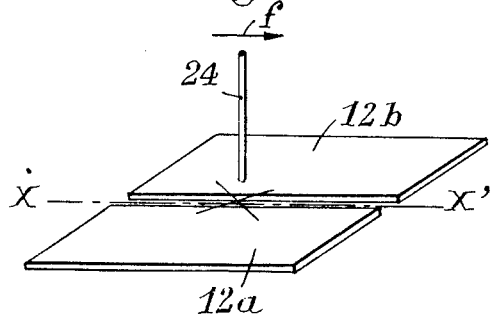
FIGS. 5 to 12 inclusive illustrate various ways of operating the device of FIGS. 1 and 2.
Figure 6:
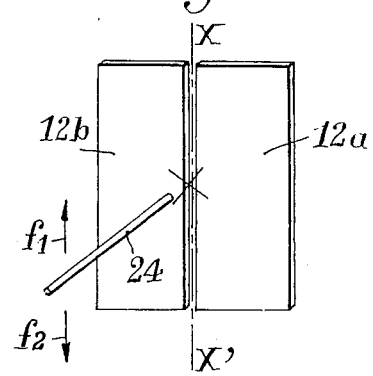
Figure 9:
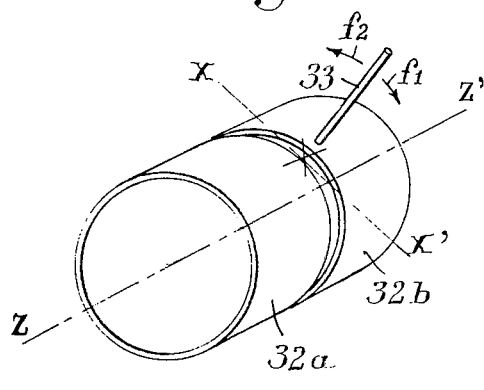
Figure 11:
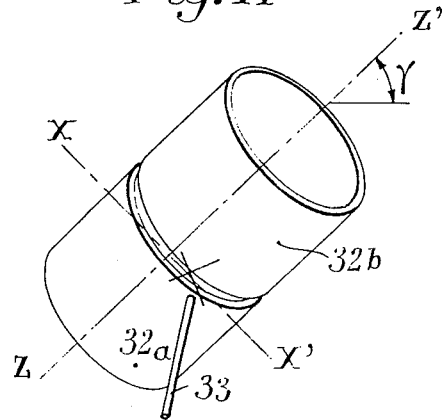
Figure 10:
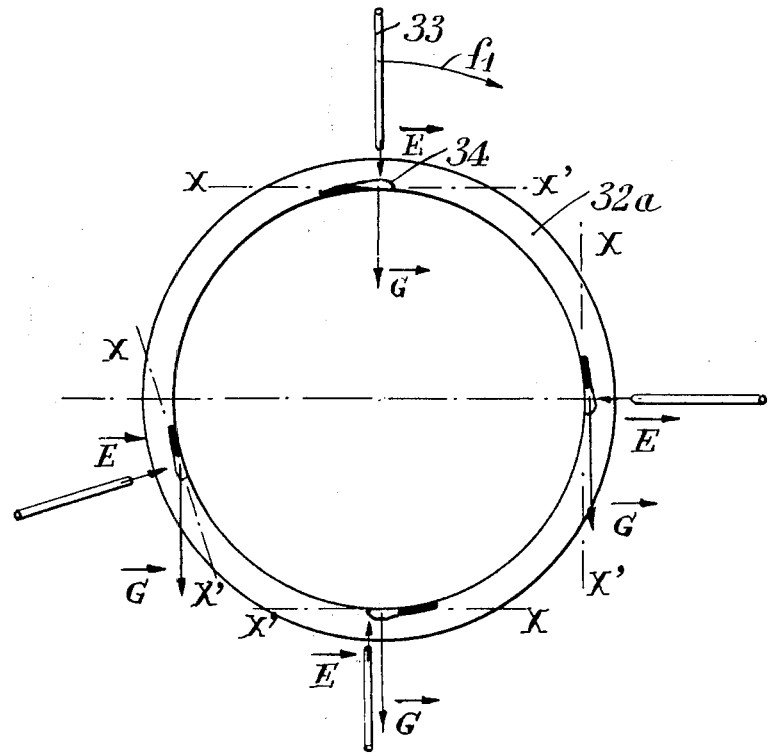

FIG. 9 illustrates diagrammatically the orbital welding of two tubular members 32a and 32b of same diameter, having their axes aligned in a same horizontal direction Z Z'; a known mechanism (not shown), is provided for controlling the movement of a welding torch 33 in a coplanar relationship with the weld seam to be formed, (which lies in a vertical or substantially vertical plane), in one or the other direction, as shown by the arrows $f_1$ and $f_2$; for a given angular position of the welding torch 33 about the horizontal axis Z Z', the direction of the weld seam is determined entirely by the tangent X X' to the circle of intersection of the external cylindrical surface of said tubular members 32a and 32b with the vertical or substantially vertical plane of said weld seam. Four successive positions of the welding torch 33 travelling in the direction of the arrow $f_1$ are shown in FIG. 10, and in addition to the local direction X X' of the weld seam, there is shown for each one of said positions, by means of a vector $\vec{G}$, the downward direction of gravity, and by means of a vector $\vec{E}$, the direction in which the drops of molten metal are ejected from the electrode of the welding torch 33; the small bath of molten metal 34 formed across the electrode of the welding head 33 assumes a shape and a space dimension depending, of course, on the relative directions X X' and $\vec{G}$, which may be perpendicular to each other, at the ends of the vertical diameter of the circular weld seam, or alternatively parallel to each other, at the ends of its horizontal diameter; however, the first two cases contemplated differ from each other in that, at the upper end of the vertical diameter, the influence of gravity tends to confine the small bath of molten metal in the seam or even to cause it to penetrate into the tubular members to be welded, whereas at the lower end of said vertical diameter gravity tends to cause the molten metal to recede towards the electrode of torch 33; under these conditions, the first position corresponds to a flat welding operation as illustrated in FIG. 5, and the second position to the "overhead" welding illustrated in FIG. 7; likewise, the welding positions corresponding to the ends of the horizontal diameter of the circular weld seam are similar to those of the vertical welding illustrated in FIG. 6; however, the feature characterising the orbital welding operation lies in the fact that the welding torch is caused to pass in succession through all the intermediate positions between those described in the foregoing. It is this continuous modification of the welding position during the orbital welding and the difficulties arising therefrom for performing this specific welding that make it highly desirable to make preliminary tests, notably when it is contemplated to repeatedly weld tubular members in fixed positions by means of automatic machines, notably for the construction of oil pipe lines. Considering however the dimensions and weight of the tubular members to be welded, it is generally difficult and expensive to make preliminary tests on a full-size scale; furthermore, in many cases these tests cannot be made for, although test welding heads are generally available, neither the complete welding equipment or mechanism, nor the tubular members themselves are available for this purpose.

Figure 2:
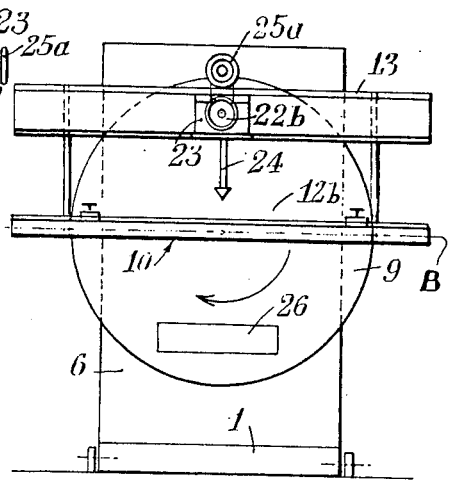

All these inconveniences may be overcome by simulating the orbital welding of fixed tubular members or sections by applying the method of this invention, which may be carried out notably by using the device of FIGS. 1 and 2; this method consists in this case in welding the adjacent or closest edges of the two flat pieces of metal 12a, 12b secured to the table 10, by pivoting said elements about a fixed axis, notably the axis A of the shaft 8 of rotary frame 9, as the welding progresses, i.e., as the carriage 15 supporting the welding head 23 is moved along the slideway 13, so that the mass of molten metal, i.e. the small bath of molten metal mentioned hereinabove, which develops in front of the welding torch 24, passes in succession through all the positions which said mass of molten metal would occupy during an actual orbital welding as illustrated in FIGS. 9 and 10. To perform this simulated orbital welding with the device of FIGS. 1 and 2, it is only necessary to preset or programme its control unit or cabinet 30 in such a manner that it will determine a preset rotational speed of adequate value of said rotary table 9, together with a suitable movement of translation of carriage 15 supporting the welding head 23, the speed of this translation being in proper relationship to the rotational speed of rotary frame 9.

The method of this invention for simulating the orbital welding of fixed metal members, notably tubular sections, is justified by the fact that it permits of reproducing with a considerable fidelity all the actual welding positions described in the foregoing with reference to FIG. 10, by assimilating in each position the curved weld-seam section to a rectilinear element; this approximation is inasmuch admissible that the tubular members to be welded have a greater diameter; this justification is also due to the fact that, at low speeds of travel of the welding head, as conventional in orbital welding operations, the tangential acceleration imparted to the small bath of molten metal due to the rotation of the sheet-metal elements 12a, 12b is definitely negligible in comparison with the acceleration due to gravity, to which said small bath is also subjected.

By giving to the flat sheet-metal elements 12a and 12b (FIG. 1) a length equal to, or a multiple of, $\pi$ times the outer diameter of the tubular members of which the welding is to be simulated, it is finally possible to simulate by means of the device shown in FIGS. 1 and 2 the complete or partial welding of a circular seam between these two tubular members.

Figure 12:
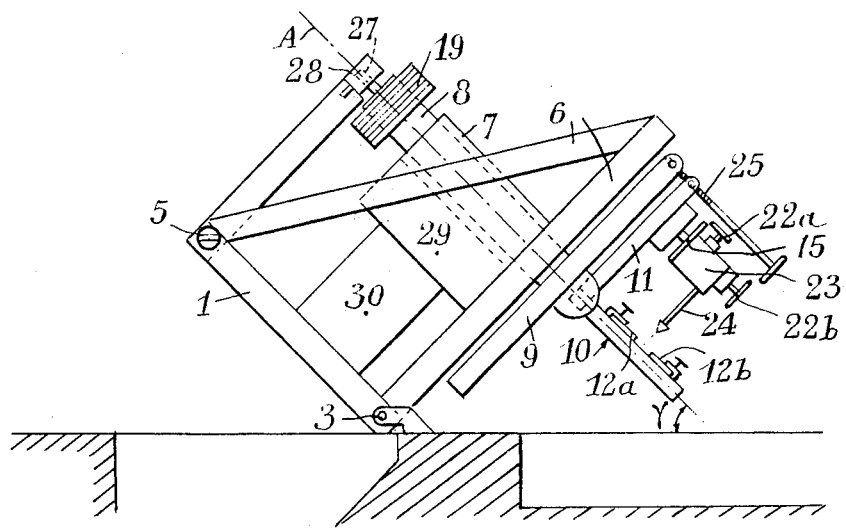

The device of FIGS. 1 and 2 also permits of simulating, by applying the method of this invention, the orbital welding of two fixed tubular elements 32a, 32b of same diameter, having their axes aligned in a direction Z Z' forming an angle $\gamma$ of any desired value with the horizontal plane; this oblique orbital welding is frequently necessary in the construction of metal structures; it can be simulated by means of the device shown in FIGS. 1 and 2 of the drawings by simply inclining by the same angle $\gamma$ the axis A of shaft 8 of rotary frame 9, i.e. by rotating the screw rod 4 in the proper direction to cause the base plate 1 of the device to pivot in the counter-clockwise direction (or in the other direction) about the pivot means 3, so as to cause said base plate to either penetrate into the pit 2 or rise above same, as shown diagrammatically in FIGS. 12.

The simulation by means of the method of this invention, of the orbital welding of two fixed metal members, notably of tubular configuration, by using the device also provided by this invention, is attended not only by the advantageous features already explained in the foregoing but also by the following additional ones, explained hereinafter: the welding operation can be observed with the same facility on both sides of the flat sheet-metal elements 12a and 12b, notably through the slot 10c of table 10 for their inner or lower face, whereas it is generally very difficult to check the progress of the welding operation from the inside of tubular members; the welding simulation accomplished on flat sheet-metal elements permits rapid and systematic comparative studies and facilitates the simulation of disturbances in the welding process; thus, disturbances due to a faulty approaching of the two edges to be welded together in tubular members to be assembled by this procedure can be simulated very easily by using flat piece of metal; as already explained in the foregoing, certain positions of the orbital welding procedure, which may give rise to certain difficulties during the welding operation, for example positions approaching the "overhead" welding operation illustrated in FIG. 7, may be studied for example by reducing the speed of the rotary plate as it rotates near these positions, or even by stopping this rotation during a predetermined time period without varying the speed of the welding-head driving carriage, so that the length of the rectilinear weld seam corresponding to each one of these critical welding positions can be elongated to afford a more convenient observation; thus, the length of such critical welding portions may be multiplied by 10; should the elements to be welded consist of a material to be necessarily preheated before the welding operation proper, it is obviously much easier to perform these preliminary operations under the required conditions when the simulation is applied to flat pieces of metal, in lieu of the tubular members themselves, especially if these have a relatively large diameter. Finally, the method and means for simulated welding according to this invention are particularly valuable for instructing and training the personnel to be subsequently entrusted with automatic welding equipments on construction sites.

The specific embodiment of the simulator according to this invention, which is illustrated diagrammatically in FIG. 13, differs from that shown in FIG. 1 only by the elimination of table 10, tray 11, slideway 13 and driving carriage 15, and by the addition of a radial arm 35 secured the outer periphery of the rotary frame 9; the welding head 23 to be tested, which may be of any suitable and desired type, is adjustably secured to the radial arm 35 by means of devices 22a and 22b, as already described hereinabove with reference to FIG. 1, in such a manner that the welding torch 24 be rotatably driven from the rotary frame 9 in a plane perpendicular to the axis A of shaft 8. Fitted on a stub shaft 36 emerging from the front face of rotary frame 9 and coaxially to said shaft 8 is a bearing 37 rigid with a plate 38, for example of triangular configuration, which comprises three clamping jaws such as 39, between which a first tubular member 32a to be welded is clamped against said plate 38; another tubular member 32b to be welded to the first member 32a is secured internally to this first member by means of welded bridge pieces 40a, 40b so that the circular edges of both tubular members 32a, 32b are brought together in the plane, perpendicular to said shaft axis A, of the likewise circular path followed by the welding torch 24 during the welding operation. A clamping jaw 41 supported at an adjustable height by a vertical guide-rod 42 is adapted to clamp the edge of the tubular member 32b and thus hold same against rotation together with its companion tubular member 32a and the clamping plate 38 with its bearing 37, in which the stub shaft 36 can rotate freely when the frame 9 is rotatably driven. It is clear that this device permits of simulating a full-scale test of a making a circular weld seam between the two tubular members 32a and 32b. Of course, different welding heads 23 may be mounted on the rotary frame 9 by means of radial arms similar to arms 35.

FIG. 14 illustrates the possibility of utilizing the device of FIG. 13 for simulating also under full-scale conditions an oblique orbital welding; this can be done by simply inclining the base plate 1 of the device by rotating the screw rod 4 in the proper direction so as to set the axis A of shaft 8 in the desired angular position $\gamma$ with respect to the horizontal plane.

Figure 15:
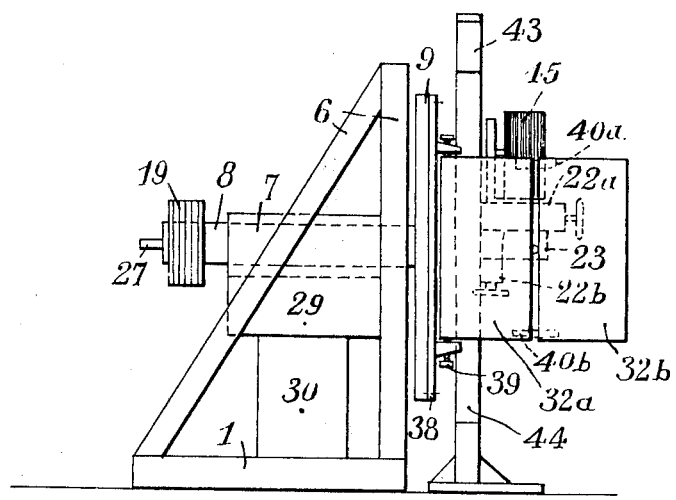
FIGS. 15 and 16 are side elevational front views, respectively, of a typical embodiment of the device according to this invention for simulating the orbital welding of two tubular metal members, which are driven in rotation during the simulation.
Figure 16:
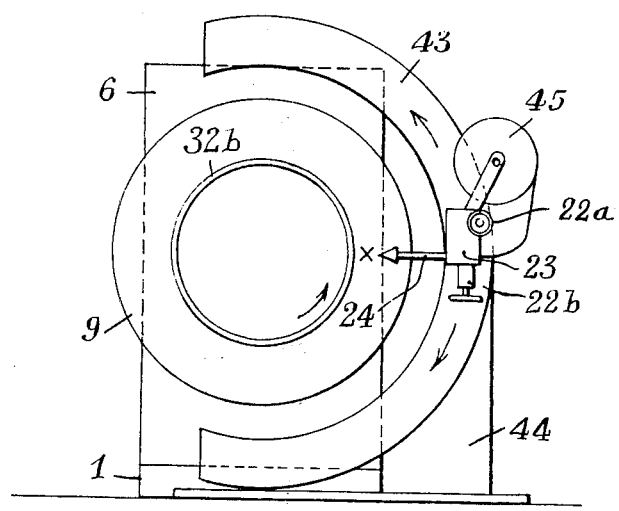

The embodiment of the welding simulator according to this invention illustrated in FIGS. 15 and 16 of the drawings differs from the device shown in FIG. 13 only in that the clamping plate 38 to which the pair of tubular members 32a and 32b are secured is mounted directly to the rotary frame 9 so as to cause said tubular members 32a and 23b to revolve about the axis A; on the other hand, the welding head 23 to be tested is mounted on a fixed C-shaped support 43 carried in turn by a vertical stand 44; the welding head may be secured for adjustment by means of devices 22a and 22b as described hereinabove in any desired angular position relative to the support 43. The reference numeral 45 designates the coil of welding wire supplying the welding head 23, this coil being also secured to the support 43. With this device a fictious orbital welding may be simulated, during which the welding position determined by the inclination of the welding torch 24 to the vertical would be invariable, the true curvature of the sheet-metal members being thereby reinstated.

Of course, the present invention should not be construed as being strictly limited to the specific embodiments shown and described herein, since it also covers all modifications and changes likely to be brought thereto, notably by substituting equivalent means for at least some of the means constituting the invention, without departing from the scope thereof as set forth in the appended claims.

What is claimed as new is:

1. Method of simulating the orbital welding of tubular metal members in a fixed position, consisting in disposing two flat pieces of metal in a common plane with two edges of said flat pieces being placed close to each other, and in pivoting said pieces of metal about an axis extending in a parallel direction to said common plane and simultaneously welding the close edges of said pieces of metal, so that the mass of molten metal successively pass through the same positions as during orbital welding.

2. Device for simulating the orbital welding of tubular metal members in a fixed position, comprising a frame rotatably mounted on means including a controllably tiltable axle, a table mounted to said rotary frame in a substantially parallel relationship to the axle of said rotary frame, carriage means mounted on said rotary frame, said carriage means being adapted to be movable parallel to said table, at least one welding head with a welding torch mounted on said carriage means for movement therewith so that said welding torch moves along a rectilinear path and means for securing a pair of flat pieces of metal to said table, with rectilinear edges of said pieces of metal being disposed close to each other substantially in the rectilinear path of said welding torch.

3. Device as set forth in claim 2, wherein said table has one edge mounted on said rotary frame so as to be tiltable about an axis perpendicular to the axle of said rotary frame, and which further comprises a tray secured to said table edge so as to extend at right angle to said table, said welding head carriage means being movably mounted to said tray, and means for holding the table and tray assembly in an adjustable tilted position in relation to said rotary frame.

* * * * *